Nov. 2, 1965 E. C. WALLBRECH ETAL 3,214,984

CHANNEL SELECTOR AND INDICATOR SYSTEM

Filed Oct. 7, 1964 2 Sheets-Sheet 1

INVENTORS,
EDWARD C. WALLBRECH
DONALD F. WILLMANN
WILLIAM T. WOOD.
BY
Harry M. Saragovitz,
Edward J. Kelly, Herbert Berl
& Julian C. Keppler
ATTORNEYS Nov. 2, 1965 E. C. WALLBRECH ET AL 3,214,984

CHANNEL SELECTOR AND INDICATOR SYSTEM

Filed Oct. 7, 1964 2 Sheets-Sheet 2

INVENTORS,
EDWARD C. WALLBRECH
DONALD F. WILLMANN
WILLIAM T. WOOD

BY Harry M. Saragovitz, Edward J. Kelly, Herbert Berl & Julian C. Keppler

ATTORNEYS

United States Patent Office 3,214,984

Patented Nov. 2, 1965

3,214,984

CHANNEL SELECTOR AND INDICATOR SYSTEM

Edward C. Wallbrech, Donald F. Willmann, and William T. Wood, Cincinnati, Ohio, assignors to the United States of America as represented by the Secretary of the Army Filed Oct. 7, 1964, Ser. No. 402,372
4 Claims. (Cl. 74—10.54)

This invention relates to a channel selector and indicator system in which two input shafts drive an output device at different rates. Rotation of the slower rate drive shaft causes rotation of the faster rate drive shaft. However, rotation of the faster rate drive shaft does not rotate the slower rate shaft due to the novel connection therebetween. Furthermore, the positions of these shafts are constantly displayed.

The principles of this invention are discussed as applied to a tunable frequency filter for use in an electronic device. However, these principles are equally applicable to multiple rank interconnected devices such as mechanical calculators where gross changes may be made in each rank to speed the desired setting and the display thereof.

High speed signal channel tuning, either electronic or mechanical, frequently demands complicated drive mechanisms to direct the selection and display the channel in use. This invention provides means to accomplish these functions in a much simplified drive system.

A proven embodiment serves to teach the new principles of this invention. It involves the tuning mechanism for channel selection in a 920 channel band from 30 to 76 mc. The tuning between channels spaced one or more megacycles is controlled by a "fast" adjustment shaft which steps the system in megacycle increments. Fine adjustments in the kilocycle range are effected by a second drive member suitably selecting 50 kc. channels within any particular megacycle range. The selected channel is displayed in megacycle terms, e.g., 30.50, 63.05, etc., on a visual indicator.

The display follows the megacycle shaft travel and jumps a megacycle step at the cross-over point between megacycle divisions, e.g., 30.95 mc. to 31.00 mc. The action of the display is that of about 15° progression or retardation during the twenty channel tuning within a megacycle expanse, then a snap jump of that amount in retrogression followed by another 15° progression or retardation and so on.

These dual drives must be so interconnected that they remain in step at all times. The present invention provides a ratchet type drive action whereby the megacycle drive shaft may be rotated with no accompanying rotation of the kilocycle shaft. But movement of the kilocycle shaft exerts a positive and directly related drive on megacycle shaft. That action is achieved in a precise and repeatable manner with simple inexpensive mechanical elements. Conventional means such as differential gearing and geneva mechanisms are avoided. The advantages and economies offered by this improvement in dual shaft controls, such as those which are used in this tuning system, may tend to obsolete these more complicated drives.

Tuning through all 920 channels is accomplished in about three seconds when the channel selector disclosed herein is used in combination with an automatic servo system. The system must stop on the selected channel from that high rate of movement, remain tuned and accurately display the frequency of the channel so selected. These conditions require low inertia, low friction and rugged drive elements. The present invention satisfies these requirements in a relatively simple dual drive control and indicator train. It comprises mechanical means for indexing the drives in the prescribed tuning sequence by ball and socket inner disk drive means and special gear and cam means for the display.

The main advantage provided by this mechanism is the improvement in tuning through and within an extended frequency range. This benefit is realized most in manual tuning between stations widely separated in the tuned range.

An object of this invention is to provide an improved tuner having means for permitting direct drive of the tuning elements in either kilocycle or megacycle steps through the tuned frequency range and means associated therewith for positive display of station tuning in both cases.

Another object of this invention is to provide an improved coupling between megacycle and kilocycle drive shafts whereby rotation of the kilocycle shaft causes rotation of the megacycle shaft, but rotation of the megacycle shaft has no effect on the kilocycle shaft.

A further object of this invention is to provide a channel display associated with a tuning mechanism in which a mask follows the megacycle channel designation when tuning is being accomplished in kilocycle steps.

A still further object of this invention is to provide a simple and inexpensive shaft coupling mechanism whereby one shaft may be rotated with no accompanying rotation of a second shaft, but movement of the second shaft exerts a positive and directly related drive on the first shaft.

With reference being made to the accompanying drawings, the operation of the invention as adapted to a tuning mechanism will now be given, this being a typical but not limiting embodiment.

Figures 2, 3:
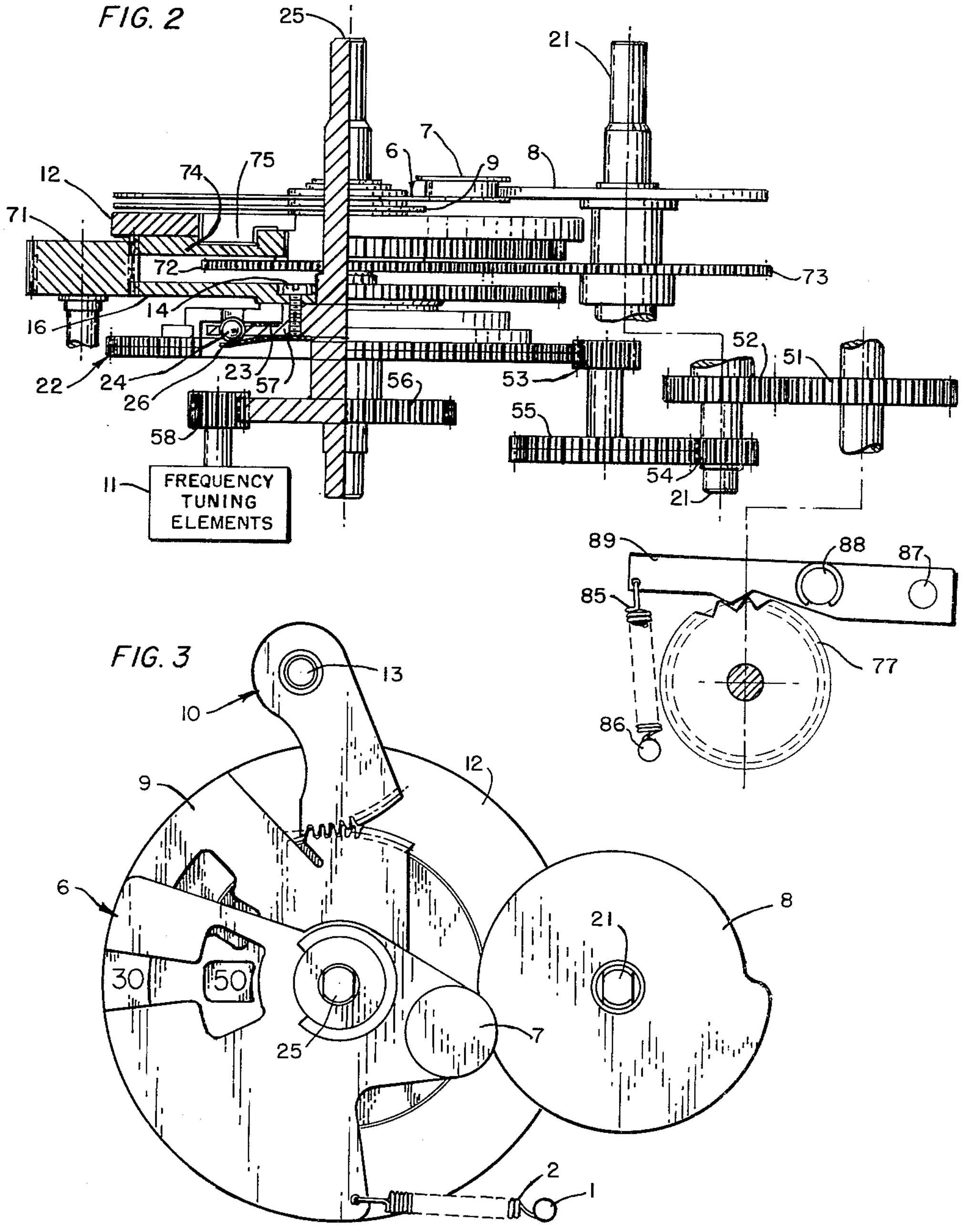
FIG. 2 is a top view in which some items are offset for a more explicit picture of the gear trains.
FIG. 3 is a front view which is intended to present only the indicator section of the invention.

The particular embodiment to be described involves the tuning mechanism for channel selection in a 920 channel band from 30 to 76 mc. The frequency tuning elements, which are represented by numeral 11 in FIG. 2, are adjustable at two different rates. The tuning between channels spaced one or more megacycles is controlled by a fast adjustment shaft 25 which steps the system in megacycle increments. Fine adjustments in the kilocycle range are effected by a second drive member 21 which selects 50 kc. channels within any particular megacycle range.

Figure 1:
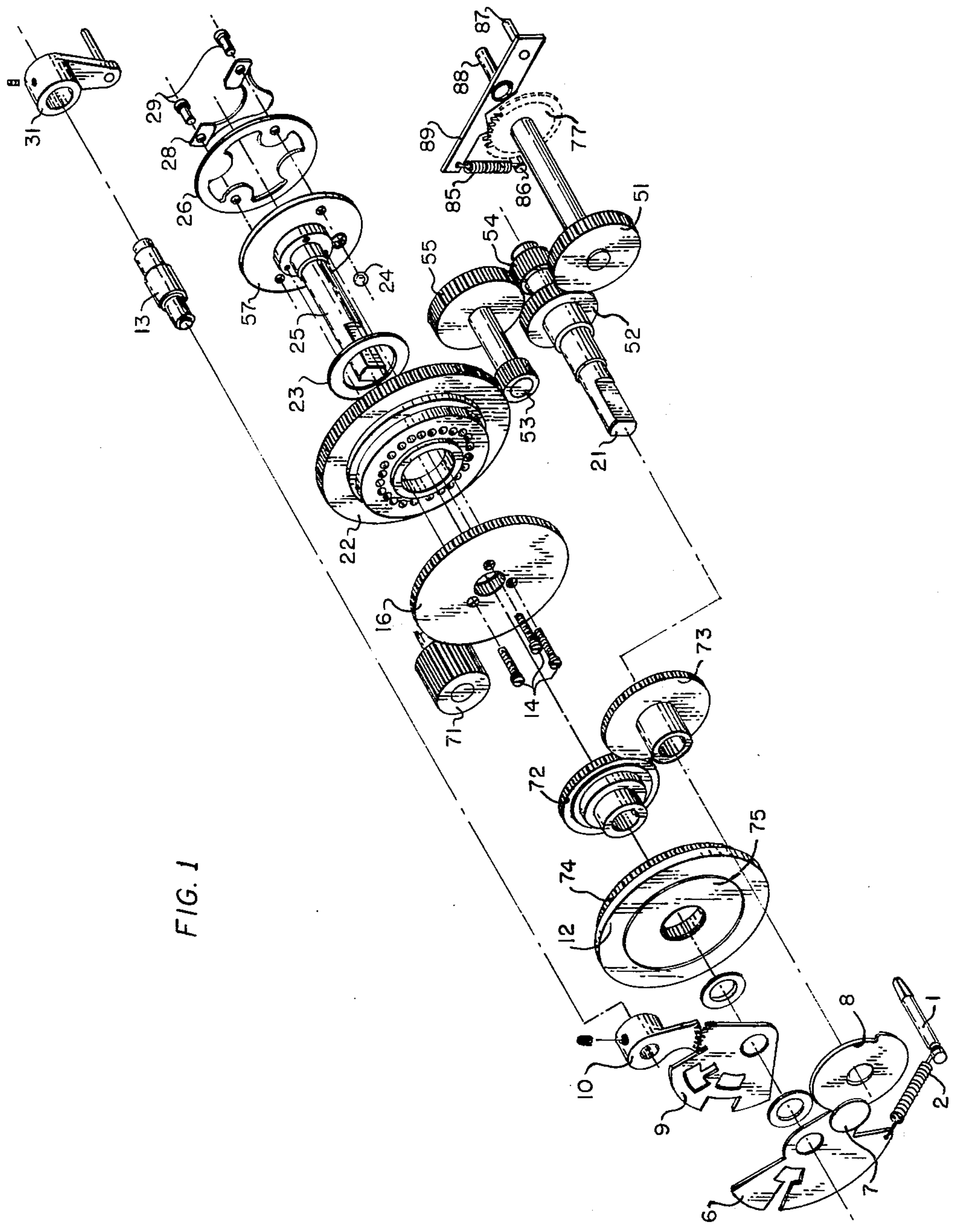
FIG. 1 shows an exploded view of the invention.

The megacycle shaft 25 drives the frequency selector's variable parameters directly through gears 56 and 58. Kilocycle shaft 21 is coupled to shaft 25 by gears 54, 55 and 53 and a ball detent mechanism which consists of a gear assembly 22, a detent spring 26, the disc like section 57 of shaft 25 and detent ball 24. The ball which is located in a hole in section 57 is spring biased toward gear assembly 22 which contains a number of holes which equals the number of megacycle channels in each of the two megacycle bands. FIG. 1 shows the spring and contact assembly 28 and the rivets 29 for securing spring 26 in its proper position. A spacer 23 separates members 22 and 57. This ball and socket assembly is constructed so that the movement between each detent makes exactly one megacycle change in the frequency selector tuning.

The display portion of the system comprises two concentric discs, the megacycle dial 12 and the kilocycle dial 75. These dials are concentric with the shaft 25 and move freely with respect to it. A gear 16, which is connected to portion 57 of shaft 25 by a bolt 14, is coupled to a gear 74 by gear 71. The dial 12 is fixedly mounted on gear 74. Dial 75 is fiexedly mounted on a short shaft projecting from a gear 72 which engages a gear 73 that rotates with kilocycle shaft 21.

A channel selector mask 9 is mounted on shaft 25 and is rotated about that shaft by band switch gear 10 which is mounted on band switch shaft 13. A band switch shaft arm 31 which is also connected to shaft 13, is rotated when it becomes necessary to change megacycle bands.

A mask assembly 6 is also mounted on shaft 25. A cam 8 which is fixedly mounted on shaft 21 engages a follower 7 on mask 6. A mask spring 2 which is connected between mask 6 and a fixed pin 1 biases follower 7 against cam 8.

A detent gear 77 is coupled by gears 51 and 52 to shaft 21. A pawl on a detent arm 89 is biased into engagement with detent gear 77 by a spring 85 which is connected to a fixed pin 86. The slope of the pawl differs from that of the notch of the wheel so that the pawl does not bottom but rides at two lines in the notch for exact centering. A ball detent arrangement with the proper loading might be used instead of the dog detent device indicated. The prime function of this indexing device is the positve locaton of the kilocycle drive mechanism. The detent arm may be rotated about post 88 by a force applied to pin 87 either by a solenoid or by manual means. This is done when it is desirable to disengage the pawl from the teeth of detent gear 77 when tuning in the kilocycle range is being accomplished by motor at relatively high speed.

A rotary drive applied to shaft 25 moves the megacycle elements (indicated by cross-hatch in FIG. 2) with respect to the kilocycle gearing by slippage past the ball detent mechanism indexed by ball 24 spring loaded by detent spring 26. Two means in combination hold the kilocycle gearing stationary during the direct rotation of shaft 25 either manually or by motor. The ball detent pressure is too low to fully overcome the inertia of the 24 to 1 gear reduction between this drive and the kilocycle drive 21. That factor is further secured by the positioning element 77 accurately located and held by the spring loaded detent bar 89.

However, a rotary drive of the kilocycle shaft 21 will rotate the complete system. The index combination of gear 77 and arm 89 is stepped (or solenoid released when a motor drive is used) and the backward drive on the ball detent index mechanism comprising ball 24 and spring 26 is insufficient to prevent a positive forward drive through the multiple detent ball and socket clutch. Gear 22 is therefore effectively locked to shaft 25 through this slip clutch mechanism.

The megacycle dial 12 has two rings of numerals each relating to one of the two megacycle bands. Channel selector mask 9 permits only one of these two rings of numerals to be viewed at any one time depending on the band in use. When the mask 9 is in the position shown in FIG. 3, the outer ring is displayed. The kilocycle indications 75 which are inside and concentric with the megacycle disc are gear controlled from shaft 21. A rotation of that shaft drives both the inner disc 75, which contains twenty kilocycle channel notations per revolution, and the outer disc 12 at the megacycle tuning rate. The outer disc 12 moves about 15 degrees for each 360 degree rotation of the inner disc.

The selected channel is displayed in megacycle terms, e.g., 30.50, 63.05, etc., on the visual indicator. When shaft 21 is rotated, mask 6 rotates a small amount due to the action of cam 8 and follower 7. The display follows the megacycle shaft travel and jumps a step at the cross-over point between megacycle divisions, e.g., 39.95 mc. to 31.00 mc., 35.95 mc. to 36.00 mc., etc. The rotation of mask 6 is about a 15 degree progression or retardation during the 20 channel tuning in one megacycle channel, then a snap jump of that amount in retrogression followed by another 15 degree progression or retardation and so on.

Continuous rotation of shaft 21 tunes through every channel in the range, and if this were done there would be no ratcheting in the ball and socket driven elements. Assume, for example, that a desired change is from the channel at 35.55 mc. to one at 43.75 mc. The fastest approach would be to drive shaft 25 through the eight megacycle indexes while advancing kilocycle shaft 21 four channels. Since the correct frequency at start and finish must be displayed, display mask 6 must move only with the kilocycle drive.

The adaptation of the present invention to a tuning mechanism provides a typical but not limiting embodiment. The new principles herein disclosed are applicable generally to compound drives and multiple rank digital equipment.

This new device is useful generally in decimal notation devices. For example, it may be applied to shaft combinations wherein one shaft moves in units, another in tens, still another in hundreds and so on. Then instead of rolling continuously through the digital coverage at unit change, each tier may be changed simultaneously. A change from 1 3 0 6 4 to 4 7 9 2 8, for example, would be accomplished by driving the unit shaft forward 4 places; retarding the 10's shaft 4 places; retarding the 100's one place; advancing the 1000's four places and the 10,000's three places. The change is achieved by five parallel minor movements representing a total of 16 steps instead of the 34,864 unit shifts required in the normal mechanical calculating machine operating on the Veeder-Root counter principle.

What is claimed is:

1. A channel selector and indicator system comprising: an output device which is to be rotated to discrete channel positions; a first shaft geared to said output device for rotating it at a rapid rate; a second shaft; detent coupling means connected between said first and second shafts for coupling rotation of said second shaft to said first shaft at a reduced rate of speed but permitting said first shaft to rotate without an accompanying rotation of said second shaft, said detent coupling means also providing detent positioning of said first shaft; display means for indicating the position of each of said shafts; and means coupled to said second shaft for accurate positioning thereof and for assisting said detent coupling means to prevent rotation of said second shaft when said first shaft is rotated.

2. The channel selector and indicator as set forth in claim 1 in which said display means comprises first and second numeral containing discs concentrically mounted on said first shaft, said first disc being geared to said first shaft and said second disc being geared to said second shaft; a cam fixedly mounted on said second shaft; masking means mounted on said first shaft and engaging said cam for continuously displaying the same numeral on said first disc until said second disc has rotated to a predetermined orientation, said masking means then jumping to the next adjacent numeral on said first disc.

3. A channel selector and indicator system for an electronic tuner comprising: a frequency tuning element, a first shaft geared to said frequency tuning element; a second shaft; combined detent slip-clutch means connected between said first and second shafts for causing said tuning element to be tuned in megacycle steps when said first shaft is rotated from one detent position to another and for causing rotation of said first shaft when said second shaft is rotated but permitting said second shaft to remain stationary when said first shaft is rotated; detent means geared to said second shaft for accurate positioning thereof in kilocycle steps and to assist said detent slip-clutch means in permitting rotation of said first shaft from one detent position to another.

4. The channel selector and indicator system as set forth in claim 3 which further includes first and second discs concentrically mounted on said first shaft, said first disc bearing megacycle notations and said second disc being located within said first disc and bearing kilocycle notations, said first disc being geared to said first shaft and said second disc being geared to said second shaft; a cam fixedly mounted on said second shaft; masking means mounted on said first shaft and engaging said cam for continuously displaying the same megacycle numeral on said first disc until said second disc has been rotated past the zero kilocycle notation, said masking means then jumping to the next adjacent megacycle numeral on said first disc.

References Cited by the Examiner

UNITED STATES PATENTS

| | | | |
|---|---|---|---|
| 2,604,791 | 7/52 | Daly. | |
| 2,886,707 | 5/59 | Jacobson et al. | 74—10.54 |

MILTON KAUFMAN, *Primary Examiner.*